W. McKIBBIN.
Wheelbarrow.
No. 9,369. Reissued Aug. 31, 1880.
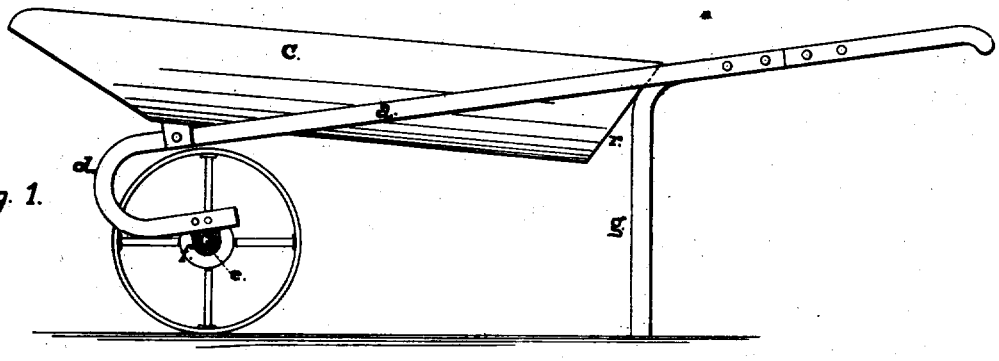
Fig. 1.
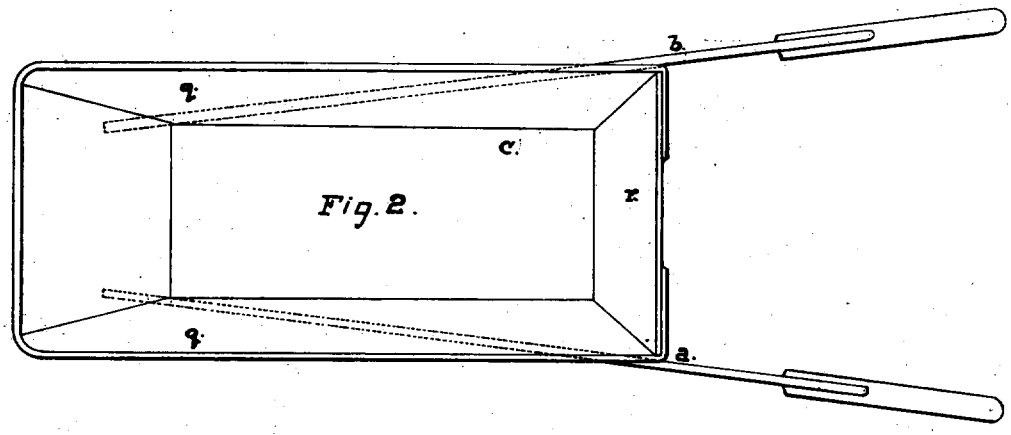
Fig. 2.
Fig. 3.
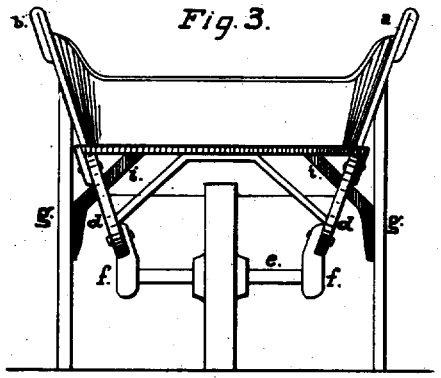
Fig. 4.
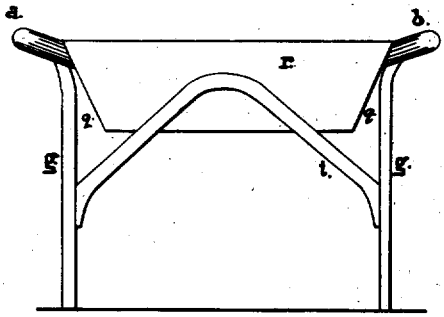
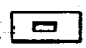
Fig. 5.
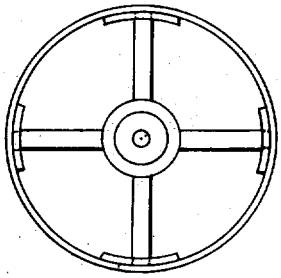
Witnesses:
J. L. Boone
Wm. P. Clark
Inventor:
William McKibbin
By his Attys,
Boone & Adams
N. PETERS, PHOTO-LITHOGRAPHER, WASHINGTON, D. C.

UNITED STATES PATENT OFFICE.

WILLIAM McKIBBIN, OF SAN FRANCISCO, CALIFORNIA.

WHEELBARROW.

SPECIFICATION forming part of Reissued Letters Patent No. 9,369, dated August 31, 1880.

Original No. 120,159, dated October 24, 1871. Application for reissue filed April 5, 1880.

*To all whom it may concern:*

Be it known that I, WILLIAM McKIBBIN, of the city and county of San Francisco, and State of California, have invented certain new and useful Improvements in Wheelbarrows; and I do hereby declare that the following is a full, clear, and exact description thereof, reference being had to the accompanying drawings.

Before my invention wheelbarrows had been constructed with straight side bars, which were usually made of wood, and when it was desired to mount the wheel underneath the tray a wooden or other block was attached underneath the front end of the side bars, so as to provide a bearing far enough below the tray to permit the wheel to be mounted under it without coming in contact with it. In some instances a channel was cut in the under side of the tray for the upper part of the wheel to run in, while the bearings of its axle were directly under the side bars.

My side bars are made of metal. This, however, is not new; but instead of making them straight I bend their front ends downward and mount the wheel between their extremities. This carries the center of the wheel down, so that the tray or box can be mounted above and clear of the wheel. I also mount the box or tray in such a manner that when the handles are raised to the wheeling position the bottom of the tray or box will be level, or nearly level, thus throwing the weight of the load equally, or nearly so, upon the two points of support, to wit, the wheel and hands.

Referring to the accompanying drawings, Figure 1 is a side elevation. Fig. 2 is a plan view of Fig. 1. Fig. 3 is an end elevation from the front of the wheelbarrow. Fig. 4 is an end elevation of the frame from the rear. Fig. 5 is a detail view of the wheel.

*a* and *b* represent the two metal side bars, the extension of which forms the handles of the wheelbarrow at one end, while the wheel is supported between the opposite ends. These side pieces are represented as being set edgewise at an angle, so as to fit against the side of the box or tray C; but this does not form any part of my invention.

The wheel ends of the side bars are bent downward and backward, forming a curve, as at *d*, in order to carry the extremities down far enough to throw the wheel under the tray. The amount of curve given to the extremities of the side bars will vary according to the distance it is desired to throw the wheel under the tray. The wheel-shaft *e* is supported in lugs *f* at each side, as shown.

The legs *g* are made of narrow metal plates similar to the side pieces, *a* and *b*. These plates are secured to the side pieces below the handles, and bent downward so as to form the legs; or the plates which form the side bars can be doubled upon themselves so as to form the handles, and the extremities bent down to form the legs. This would form the legs and side bars out of a single piece of metal. The legs are braced by bars *i*, which are also secured to and serve to support the rear end of the box; but this is not claimed.

The box or tray which I have represented is made with two nearly vertical sides, *q*, and the corresponding rear end, *r*. The forward end is made sloping, so as to give the box a scoop-shaped appearance; but this is only for convenience, and is not claimed as novel or a part of my invention, as trays have been made sloping both in front and rear before my invention.

The box or tray, whatever its shape, is secured upon or between the side bars, *a b*, so that it will tip slightly toward the handles when the legs of the barrow are resting upon the ground, as represented at Fig. 1; but when the handles are raised to the ordinary height that they are carried in wheeling the barrow the tray will be brought to a level, or approximately so, thus causing the weight of the load to be distributed between the wheel and arms of the person propelling it.

The downward and backward curved ends of the side bars provide a bearing for the wheel that is sufficiently below the bottom of the tray to allow the wheel to be mounted under the forward end of the tray without coming in contact with its bottom.

Having thus described my invention, what I claim, and desire to secure by Letters Patent, is—

1. In a wheelbarrow, the metallic side bars, *a b*, made each in one piece, and having their forward ends bent or curved downward to form or provide bearings for the wheel-shaft, to admit of the wheel being placed under the tray, substantially as specified.

2. In a wheelbarrow the side bars of which are bent downward and backward so as to bring the wheel under the tray, the box or tray C, mounted upon or between the side bars, so that when the handles are raised the box shall be level, for the purpose specified.

In witness whereof I have hereunto set my hand and seal.

WM. McKIBBIN. [L. S.]

Witnesses:

THOS. McKIBBIN,

WM. F. CLARK.